R. F. ROGERS.
FRICTIONAL GEARING FOR MOTOR VEHICLES.
APPLICATION FILED OCT. 7, 1910.
1,147,268.
Patented July 20, 1915.
4 SHEETS—SHEET 1.
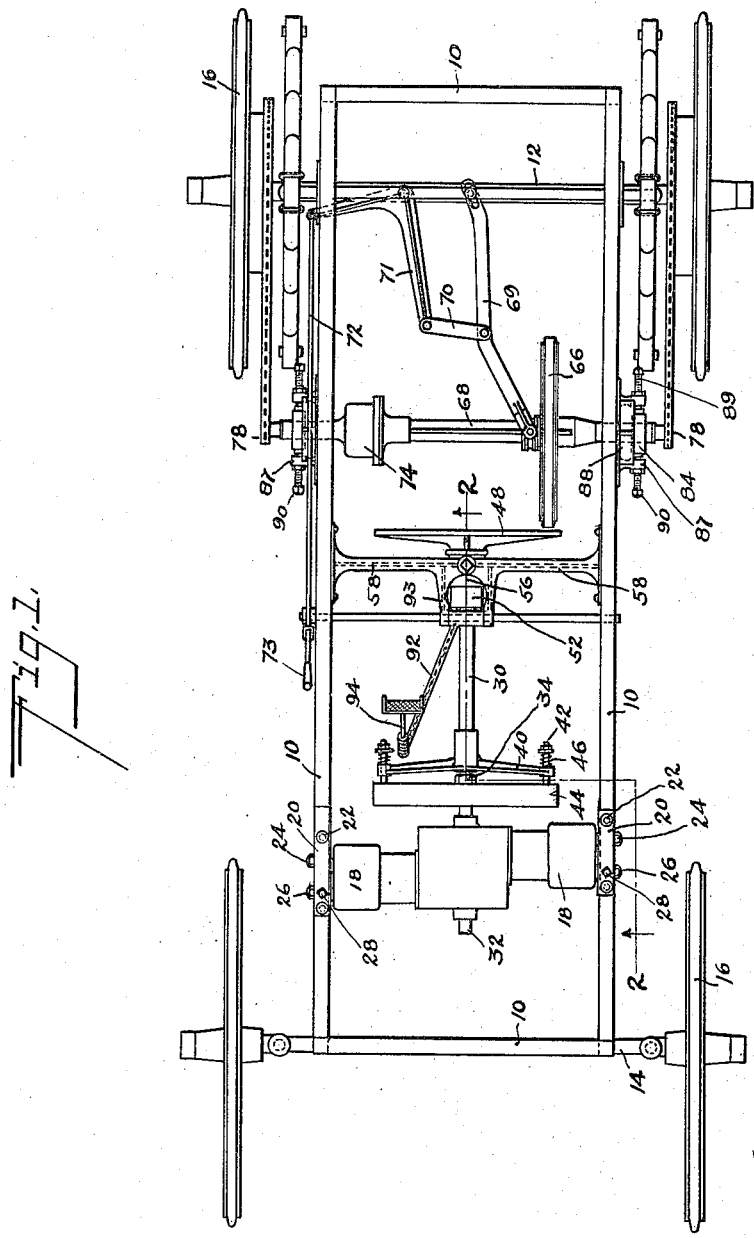
Ralph F. Rogers, Inventor.
Witnesses:
By David O. Barnell,
Attorney.

R. F. ROGERS.
FRICTIONAL GEARING FOR MOTOR VEHICLES.
APPLICATION FILED OCT. 7, 1910.
1,147,268.
Patented July 20, 1915.
4 SHEETS—SHEET 2.
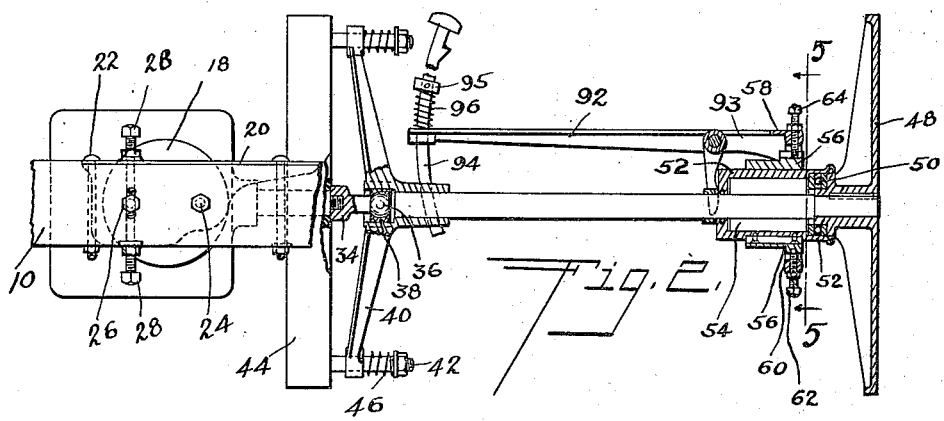
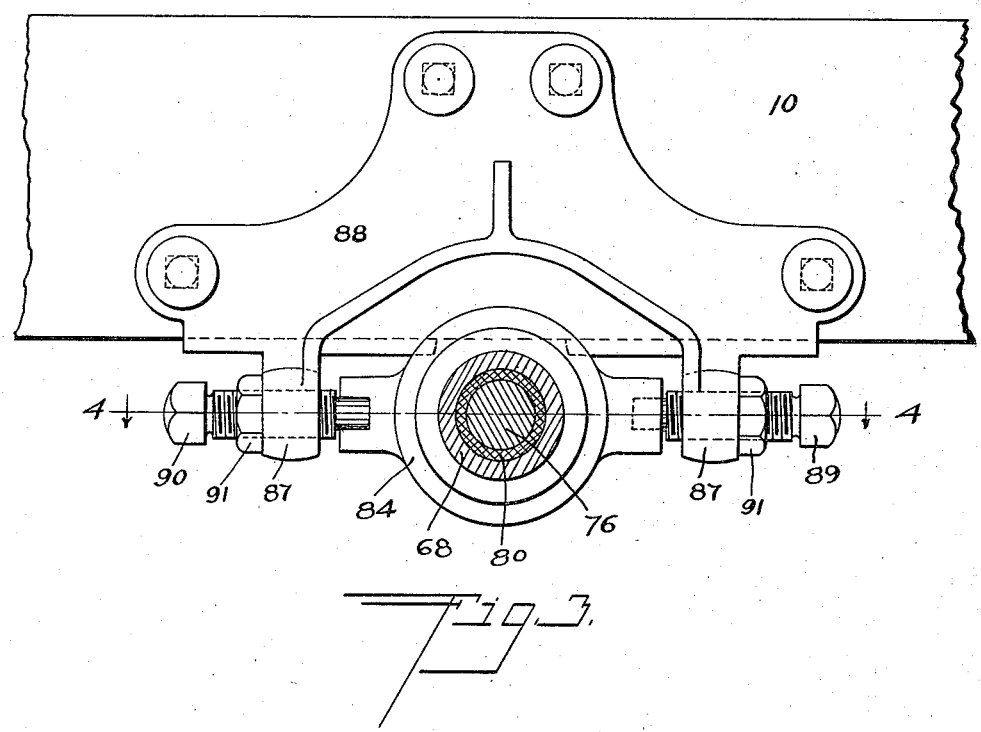

R. F. ROGERS.
FRICTIONAL GEARING FOR MOTOR VEHICLES.
APPLICATION FILED OCT. 7, 1910.
1,147,268.
Patented July 20, 1915.
4 SHEETS—SHEET 3.
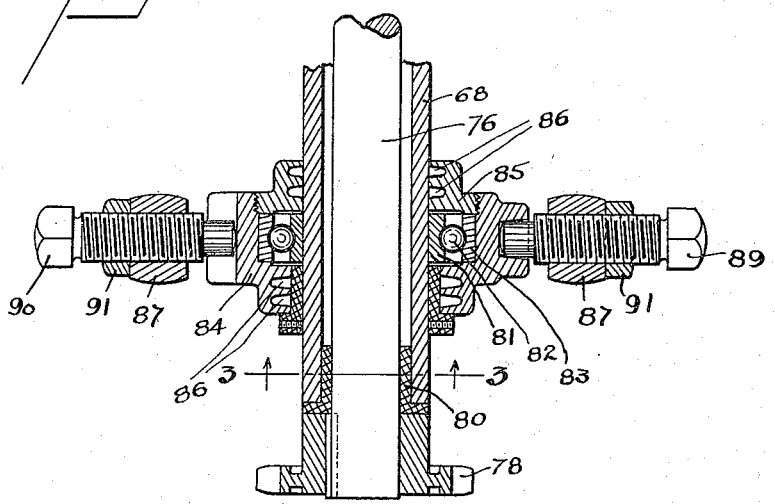
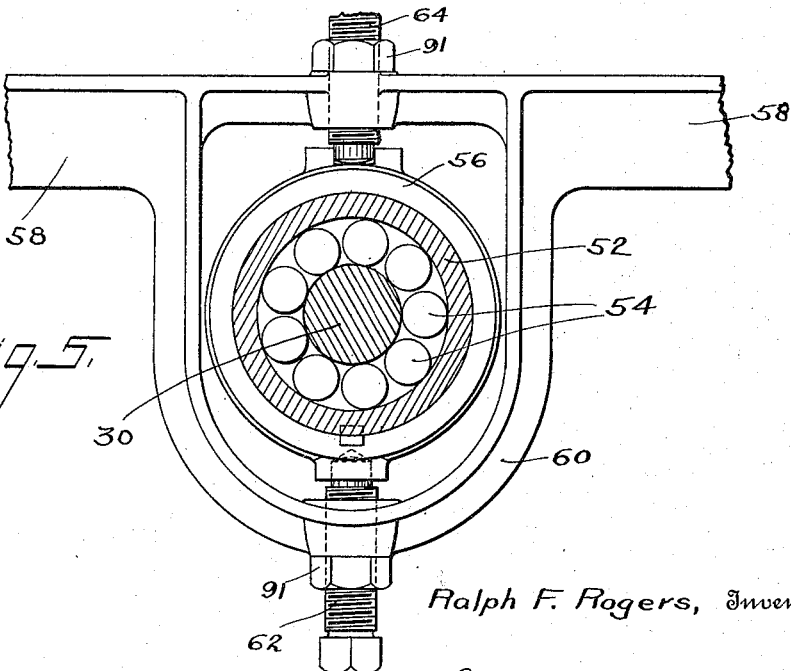

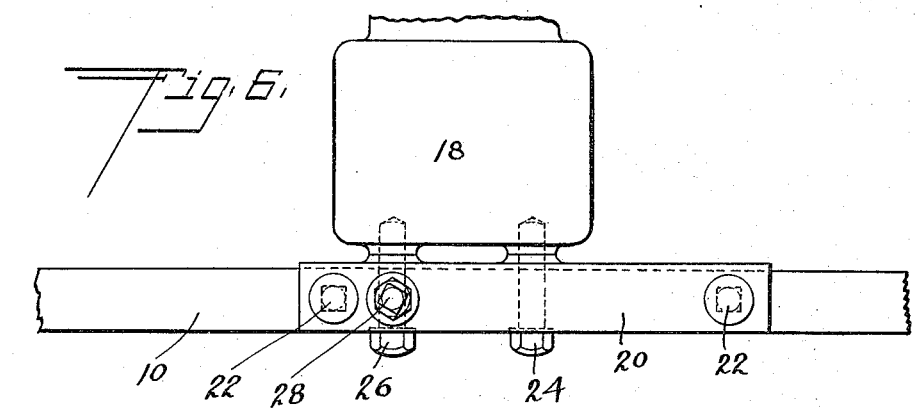
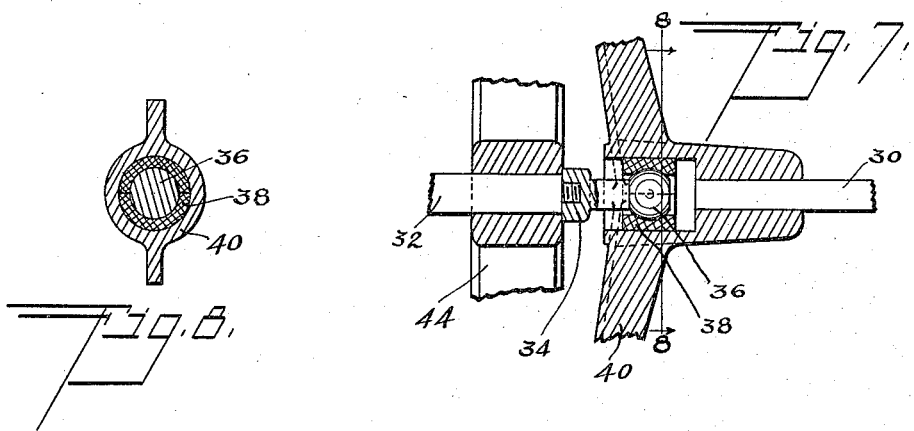
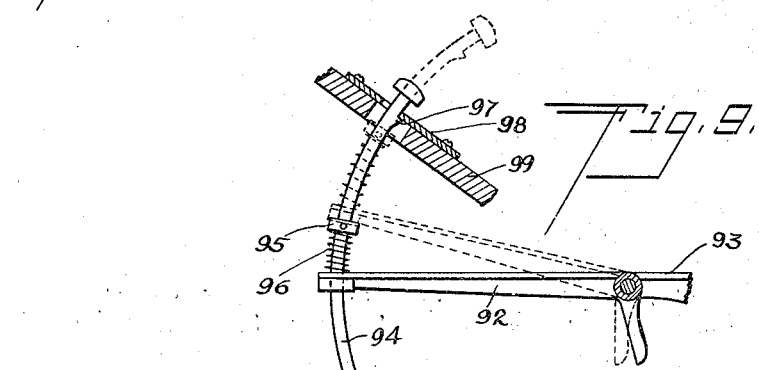

UNITED STATES PATENT OFFICE.

RALPH F. ROGERS, OF OMAHA, NEBRASKA.

FRICTIONAL GEARING FOR MOTOR-VEHICLES.

1,147,268.  Specification of Letters Patent.  Patented July 20, 1915.

Application filed October 7, 1910. Serial No. 585,900.

*To all whom it may concern:*

Be it known that I, RALPH F. ROGERS, a citizen of the United States, residing at Omaha, in the county of Douglas and State of Nebraska, have invented certain new and useful Improvements in Frictional Gearing for Motor-Vehicles, of which the following is a specification.

My invention relates especially to motor vehicles employing an internal-combustion engine and friction-drive speed-changing transmission mechanism between the engine and the propelling wheels.

It is the object of my invention to provide in such a vehicle certain improvements in the alining, connecting and controlling devices of the transmission mechanism so as to permit the use of a comparatively flexible or resilient frame, and at the same time to provide a structure which will be simple, efficient, durable and inexpensive to manufacture.

In the accompanying drawings, Figure 1 is a plan view of the chassis of a vehicle embodying my invention, Fig. 2 is a partial longitudinal section on the axis of the transmision shaft, Fig. 3 is a detail side elevation of one of the bearings and bearing hangers of the jack-shaft, Fig. 4 is a detail horizontal section through said bearing, Fig. 5 is a detail rear elevation of the hanger for the transmission-shaft bearing, the bearing itself being in section, Fig. 6 is a detail plan view of the engine and frame connection, Fig. 7 is a detail axial section through the connecting portions of the engine shaft and transmission-shaft, Fig. 8 is a detail transverse section of the same, and Fig. 9 is a detail side elevation of the clutch-pedal and lever connection.

In the several figures the planes of section of other figures are shown by dotted lines designated by the numerals of the figures to which they refer.

In carrying out my invention I preferably employ a frame 10 made of wood of such kind and proportions as to have a certain resilience, and under its normal load to bend more or less in a vertical plane between the front and rear supporting springs thereof. I prefer also to employ a "three-point suspension" for the frame, such suspension being attained by the use of two longitudinally extending elliptical springs to connect the rear axle 12 and the frame, and a single elliptical spring to connect the front axle 14 and the frame, the latter spring having a pivotal connection with the frame so that transverse tilting of the axle 14 is permitted without causing torsional stresses in the frame.

The use of the foregoing devices enables the construction of an easy-riding vehicle having solid-tired wheels instead of the more expensive pneumatic-tired wheels. While the aforesaid structures form no part of my present invention, they, and especially the resilient frame, are incident thereto and necessitate or render desirable certain features of the structures comprised in my invention.

The engine in the vehicle shown is of the opposed-cylinder type, and the width of the frame 10 is made such that the engine will just fit between the side members thereof with the ends of the cylinders 18 in proximity thereto. Adjoining the ends of the cylinders hanger-plates 20 are secured upon the frame by bolts 22, the said plates having bosses on the inner faces thereof which are adapted to fit against similar bosses formed on the ends of the cylinders. The bosses on the cylinders have threaded openings therein adapted to receive the ends of screws 24 and 26 which are passed transversely through openings in the frame and the bosses on the hanger-plates. The openings for the screws 24 are made slightly larger than the screws. The openings for the screws 26 are elongated vertically, and adjusting-screws 28 are passed vertically from the upper and lower flanges of the hanger-plates to engage the screws 26 at the upper and lower sides thereof. The engine is supported upon the frame solely by means of the screws 24 and 26, and by making suitable adjustments of the screws 28 the axis of the engine shaft may be slightly tilted longitudinally of the machine and on a transverse axis passing through the screws 24.

The transmission-shaft 30 is disposed in substantial longitudinal alinement with the engine shaft 32 and is flexibly connected therewith by the coupling devices shown in detail in Figs. 2, 7 and 8. Upon the rear end of the engine shaft is screwed a nut 34 and from said nut a cylindrical neck extends rearwardly and carries at the end a spherical head 36. Around said spherical head is disposed a two-part bushing 38 of which the bore is shaped so as to fit partly around the spherical head. Said bushing fits slidably into the cylindrical bore of the coupling-spider 40 of which the hub portion is secured upon the front end of the transmission-shaft. The radial arms of the coupling-spider have openings at the ends through which pass the studs 42 which extend out rearwardly from the rim of the fly-wheel 44. Said studs carry at their ends adjusting-nuts which are threaded thereon, and between said nuts and the arms are disposed coil springs 46.

At the rearward end of the transmission-shaft the driving friction-plate 48 is secured thereon. Adjoining the hub of said plate is a thrust-bearing 50 which is inclosed within the rearward end of the sleeve 52 of the roller-bearing 54. The said sleeve fits slidably within the bore of the housing-ring 56 and is provided at one side with a spline which fits into a groove in the housing-ring to prevent relative rotation of the sleeve and ring. The housing-ring is pivotally supported upon the rigid cross-piece 58 of the frame, a U-shaped portion 60 integral with the cross-piece extending downwardly therefrom and around the housing-ring, as shown in Fig. 5. A screw 62 extends up through the lower part of the portion 60, and the end of said screw enters a recess formed in a lug on the lower side of the housing-ring. A similar screw 64 extends down through the cross-piece, and the end of the latter screw enters an axially extending slot in the upper side of the housing-ring, as indicated in Figs. 2 and 5.

The friction-wheel 66 is mounted upon the jack-shaft 68 and is slidably connected therewith by a spline, suitable rod-and-lever connection 69, 70, 71, 72 and 73, being provided for shifting the wheel longitudinally of the shaft to vary its relation to the driving friction-plate 48. The jack-shaft is tubular and near one end carries a casing 74 in which is disposed the usual differential gearing. From the differential gearing the driving shafts 76 extend out through the ends of the jack-shaft and at their ends carry the sprocket pinions 78 from which the driving chains extend to the sprocket wheels on the rear wheels. Suitable bearings 80 for the shafts 76 are arranged within the bore of the jack-shaft. The jack-shaft is journaled in annular ball-bearings each comprising a ring 81 secured upon the shaft, a series of balls 82, and an outer ring 83. The latter ring is clamped within a housing made by screwing together the two parts 84 and 85, each of which extends down on one side of the annular ball bearing and has annular grooves 86 therein adjoining the shaft. Said grooves are kept filled with hard-oil or grease which serves to trap and exclude dust and other foreign matter from the ball-bearings. The bearing housings are pivotally supported between the depending arms 87 of the bearing-hangers 88 which are secured upon the frame 10, as indicated in Fig. 3. Screws 89 are passed through the rearward arms of the bearing hangers and enter suitable recesses formed in the rearward sides of the housing-members 84, and similar screws 90 are passed through the forward arms of the hangers and enter the axially extending slots in the front sides of the housing-members 84, as indicated in Figs. 3 and 4. For holding the same in adjusted positions suitable locking-nuts 91 are provided upon the screws 89 and 90 and upon the screws 62 and 64 which engage the housing-ring 56 of the transmission-shaft bearing.

The driving connection from the engine to the wheels is established and broken by longitudinal shifting of the transmission-shaft so as to move the plate 48 toward and away from the wheel 66. The pressure of the coupling-springs 46 upon the arms of the coupling-spider normally pulls the transmission-shaft forwardly so as to disengage the plate 48 from the wheel 66. The shaft may be moved rearwardly so as to engage said plate and wheel, by means of the clutch-lever 92, which is fulcrumed between the arms 93 extending forward from the frame cross-piece 58. The said lever has a forked depending portion adapted to engage the front side of the casing of the bearing 54, and a forwardly extending arm through the end of which the arcuate pedal-bar 94 is slidably passed. The pedal-bar is provided at the upper end with a foot-piece and upon its central portion has a collar 95 between which and the lever is disposed a spring 96 which normally holds the bar in raised position. Near the upper end of the bar is formed a tooth or projection 97 which is adapted to be engaged with a suitable stop-plate 98 carried on the foot-board 99 of the vehicle-body, as shown in Fig. 9. The normal positions of the lever and pedal-bar are indicated by the dotted lines in Fig. 9. When the pedal-bar 94 is pressed downwardly from the normal raised position thereof, it first compresses the spring 96 slightly, and the pressure of the spring on the lever 92 moves said lever down to the position thereof shown by full lines in Fig. 9. By said movement of the lever 92 the friction-plate 48 is moved rearwardly far enough to engage the friction-wheel 66. The pressure between said plate and wheel necessary for properly driving the vehicle is then attained by further depression of the pedal-bar, which movement is expended in compressing the spring 96. The strength of the spring and the relation of the locking projection 97 and stop-plate 98 are preferably made such that when the projection is engaged with the plate the pressure of the spring on the clutch-lever will be such as to cause sufficient friction between the plate 48 and wheel 66 to either drive the vehicle or stop the engine, when operating under normal conditions. By such an arrangement of the clutch mechanism, the proper running pressure between the friction-wheel and driving-plate is maintained, and it is possible to avoid locking the clutch-lever in a position such as to cause over-pressure with resultant excessive friction, or under-pressure which may result in slipping between the engaged friction surfaces and the consequent wearing of flat spots on the wheel 66. It will be obvious that, under temporary abnormal conditions requiring extra pressure between the friction wheels, such additional pressure may be obtained by depressing the pedal-bar further than is necessary to engage the projection 97 with the stop-plate.

The connections between the frame 10 and the bearings of the jack-shaft and transmission-shaft being made solely by the screws 62, 64, 89 and 90, said shafts may be quickly and easily adjusted to a proper alinement with each other, that is to say to such positions that the axes thereof will be exactly perpendicular to each other. By the adjustable supporting connections of the engine, the engine shaft may be quickly and easily brought to alinement with the transmission shaft. By the peculiar pivotal mounting of the bearings any springing or yielding of the frame is permitted without causing binding and excessive friction and wear of the bearings, and any yielding of the frame between the engine and the bearing of the transmission-shaft is permitted by the flexible and slidable coupling between the engine shaft and transmission-shaft. By the pivotal mounting of the transmission-shaft bearing on a vertical axis the lateral stresses on the transmission-shaft, caused by the engagement of the wheel 66 with the plate 48, are transmitted to the bearings of the engine shaft, the plate 48 and the shaft forming in effect a bell-crank fulcrumed on the axis of the screws 62 and 64. Practically all lateral stress or tendency of the transmission-shaft to bind in the bearing 54 is thus avoided, while, owing to its distance from the fulcrum, the lateral stress which is thrown upon the bearing of the engine shaft is not excessive.

Now, having described my invention, what I claim and desire to secure by Letters Patent is:

1. In a motor vehicle, the combination with a friction-drive speed-changing mechanism having a longitudinal driving shaft and a transverse driven shaft, of pivotally mounted bearings for the transverse shaft, means for adjusting the position of said bearings in a horizontal plane, a pivotally mounted bearing for the longitudinal shaft, and means for adjusting the position of said bearing in a vertical plane.

2. In a motor vehicle, the combination with a friction-drive speed-changing transmission mechanism having a longitudinal driving shaft, a transverse driven shaft, and a frame carrying said transmission mechanism, of pivoted bearings for the transverse shaft, means for adjusting the position of said bearings in a horizontal plane, a pivoted bearing for the longitudinal shaft, and means for adjusting the position of said bearing in a vertical plane.

3. In a motor vehicle, the combination with a friction-drive speed-changing transmission mechanism having a longitudinal shaft, a driving plate carried by said shaft, a transverse shaft, and a friction-wheel slidably mounted thereon and engageable by the driving plate, of pivotally mounted bearings for the transverse shaft, a pivotally mounted bearing for the longitudinal shaft, means for adjusting the position of the bearings of the transverse shaft toward and away from the driving plate, and means for adjusting the position of the bearing of the longitudinal shaft in a direction substantially at right angles to the axes of both the shafts.

4. In a motor vehicle, the combination with a resilient frame, of a longitudinal driving shaft, a bearing for said longitudinal shaft pivotally connected with the frame, means for adjusting said bearing in a vertical plane, a transverse shaft, bearings for said shaft pivotally connected with the frame, means for adjusting said bearings in a horizontal plane, and frictional driving means connecting said longitudinal and transverse shafts.

5. In a motor vehicle, the combination with a flexible frame, and speed-changing transmission mechanism including a driving shaft and a driven shaft disposed at right angles to each other, of bearings for said shafts, housings disposed around said bearings, hangers for said housings, said hangers being fixedly secured to the frame, and adjusting means for connecting said hangers and housings, each comprising a pair of screws carried by the hanger and disposed on opposite sides of the housing, one of the screws entering a recess in one side of the housing and the other screw entering an axially extending groove in the other side of the housing.

6. In a motor vehicle, the combination with friction-drive speed-changing transmission mechanism having a driving shaft and a driven shaft disposed at right angles to each other, of bearings for said shafts each having a non-rotating housing, a hanger having portions adjoining said housing, a pair of screws carried by the hanger and disposed on opposite sides of the housing, one of said screws entering a recess in one side of the housing, and the other screw entering an axially extending groove in the other side of the housing.

7. In a motor vehicle, the combination with friction-drive speed-changing transmission mechanism having a driving shaft, a driving plate carried at one end of said shaft, and a friction wheel engageable by the driving plate, of a bearing for the driving shaft arranged adjoining the driving plate, and means for pivotally supporting said bearing on an axis substantially at right angles to the axes of both the driving shaft and the friction wheel.

In testimony whereof I have hereunto subscribed my name in the presence of two witnesses.

RALPH ROGERS.

Witnesses:
DAVID O. BARNELL,
H. J. CATHROE.